United States Patent [19]
Levi et al.

[11] Patent Number: 5,549,407
[45] Date of Patent: Aug. 27, 1996

[54] LOCKING MECHANISM FOR TELESCOPING TUBULAR POLES

[75] Inventors: Avraham Y. Levi, St. Paul; Craig D. Quarberg, Big Lake, both of Minn.

[73] Assignee: Structron Corporation, San Marcos, Calif.

[21] Appl. No.: 419,262

[22] Filed: Apr. 10, 1995

[51] Int. Cl.[6] ........................................ F16B 7/14
[52] U.S. Cl. ........................... 403/109; 403/350; 403/374
[58] Field of Search .................................. 403/109, 110, 403/350, 351, 352, 367, 374, 343

[56] References Cited

U.S. PATENT DOCUMENTS

| | | |
|---|---|---|
| 1,115,057 | 10/1914 | Delaney . |
| 2,526,415 | 10/1950 | Refsdal . |
| 2,873,129 | 2/1959 | Edmundson . |
| 3,419,227 | 12/1968 | Werkmeister et al. ............. 403/350 X |
| 3,419,293 | 12/1968 | Conrad . |
| 3,515,418 | 6/1970 | Nielsen . |
| 3,596,946 | 8/1971 | Burton et al. . |
| 4,076,437 | 2/1978 | Mazzolla . |
| 4,419,026 | 12/1983 | Leto ..................................... 403/109 X |
| 4,632,597 | 12/1986 | Clausen et al. ......................... 403/351 |
| 4,659,125 | 4/1987 | Chuan ................................. 403/351 X |
| 5,011,319 | 4/1991 | Levi et al. . |

OTHER PUBLICATIONS

Cross Sectional views of pole locking device sold by applicants prior to Apr. 10, 1994.

Primary Examiner—Anthony Knight
Attorney, Agent, or Firm—Haugen and Nikolai, P.A.

[57] ABSTRACT

A lock for selectively allowing and preventing relative longitudinal displacement of an outer and inner telescoping tube segments. It comprises a tubular cam adapted to plug into and rotate with one end of the inner tube segment. It has associated with it a pair of arcuate cam followers, each with an outer and an inner cylindrical surface where the outer cylindrical surface can be forced by the action of the tubular cam to frictionally engage the inner surface of the outer telescoping tube segment upon rotation of the inner telescoping tube segment.

11 Claims, 3 Drawing Sheets

5,549,407

LOCKING MECHANISM FOR TELESCOPING TUBULAR POLES

BACKGROUND OF THE INVENTION

1. Field of the Invention

This invention relates generally to a locking mechanism for telescoping extendable pole segments, and more particularly to an improved cam and cam follower arrangement which, upon a quarter turn of one pole segment relative to the other, with only a modest force, the two pole segments become rigidly locked together against relative longitudinal displacement.

2. Discussion of the Prior Art

The present invention is an improvement over the pole locking mechanism described in my earlier U.S. Pat. No. 5,011,319. The pole locking mechanism described in that patent includes a solid (non-tubular) cam fastened to the end of the inner telescoping pole segment where the cam member includes a pair of lobes for cooperating with an arcuate recess of a particular geometry formed in an inner surface of a pair of surrounding cam follower segments. Because the cam member and the plug portion thereof used to affix it to the end of the inner telescoping tube segment is a solid (non-tubular) piece, it is impossible with that design to permit objects of any type to traverse the lumens of the telescoping tube segments. Thus, for example, if the telescoping tubes form the stand for lighting or sound systems used in stage presentations, with a pole lock of my prior art design, it was necessary that the wiring be exterior to the telescoping poles comprising the elongated stand. Moreover, because the lock assembly fit with a close tolerance between itself and the segments of the telescoping poles with which it interfaced, a pneumatic resistance has been encountered when extending and contracting the pole segments in some applications.

SUMMARY OF THE INVENTION

In accordance with the present invention, the locking mechanism for releasably locking an inner and outer cylindrical telescoping tube segment against relative longitudinal movement includes an elongated, rigid tubular cam having a pair of diametrically opposed cam surfaces of continuously varying radii on its exterior which extend over a predetermined arc between a pair of radially spaced longitudinally extending stop members. Cooperating with the tubular cam are first and second cam followers. The cam followers are disposed in surrounding relation to the tubular cam. Each cam follower comprises a generally cylindrical segment having an outer surface of a first predetermined radius and a concentric cylindrical inner surface of a second radius less than the first predetermined radius. The cylindrical inner surface of each segment includes an outwardly projecting, longitudinal rib for engaging the cam surfaces and the pair of radially spaced longitudinal stop members. The elongated tubular cam is affixed to and projects longitudinally from one end of the inner telescoping tube segment, while the first and second cam followers have their generally cylindrical outer surfaces cooperating with the inside wall of the outer telescoping tube segment. Rotation of the inner tube segment relative to the outer tube segment in a first direction is effective to spread the first and second cam followers apart, thereby increasing the friction between them and the inner wall surface of the outer telescoping tube segment. Rotation of the inner telescoping tube segment in the opposite direction releases the pressure exerted by the cam followers against the inner wall of the outer telescoping tube segment.

As in the prior art tube lock described in the aforereferenced '319 patent, the present invention offers the advantage that the amount of longitudinal force between the inner and outer tube segments before any slippage will take place can be varied to suit the particular application by merely adjusting the length of the cam follower segments and thus the degree of friction which must be overcome. It offers the additional advantage that the elongated rigid cam is tubular, permitting objects to be routed through the internal lumen of the first and second telescoping tubular segments, a feature not possible with my prior art design. Because of the existence of a passage through the cam, pneumatic resistance to movement of the pole segments relative to one another is practically eliminated.

DESCRIPTION OF THE DRAWINGS

The following features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
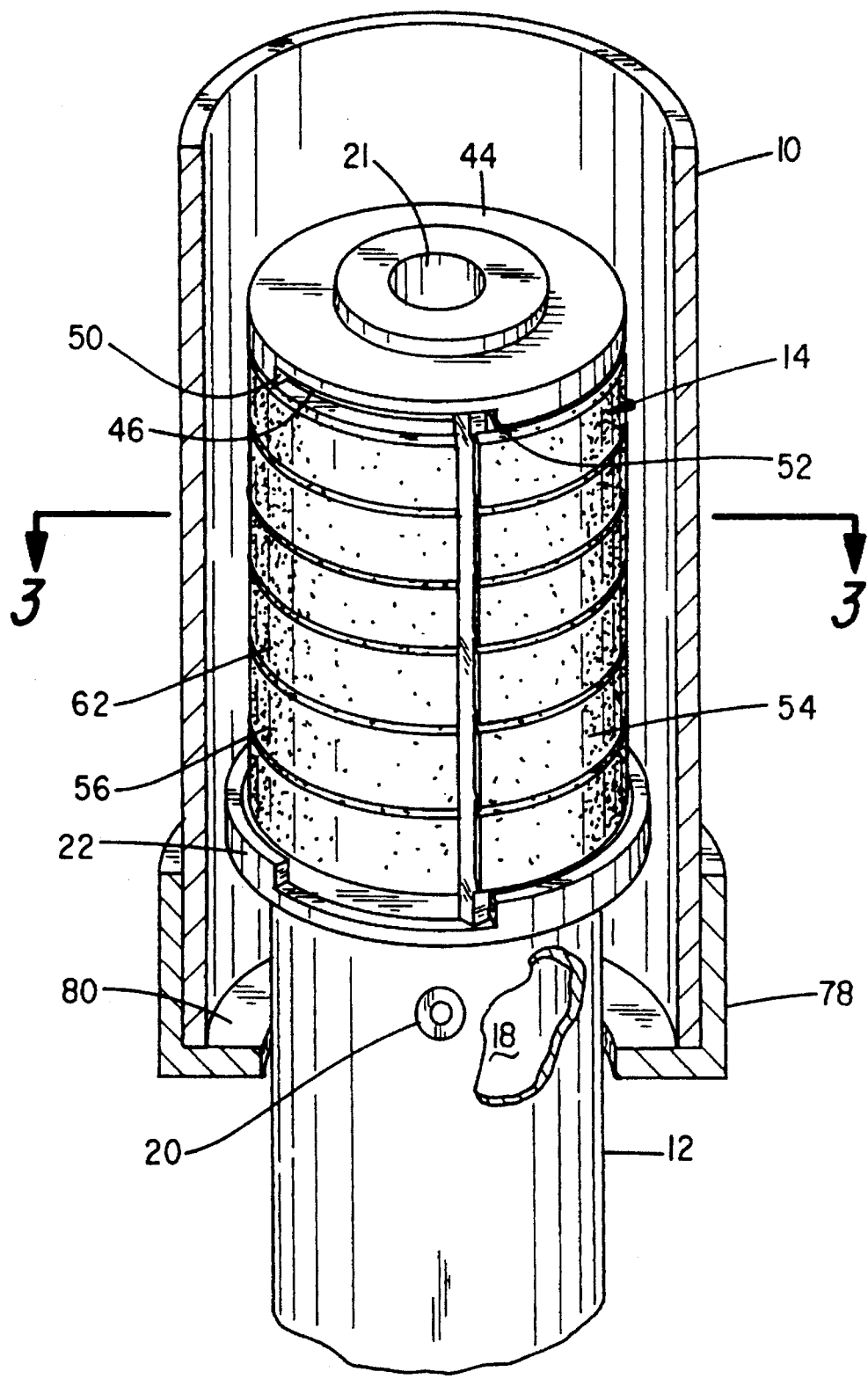
FIG. 1 is a partial, sectioned, perspective view of the pole lock in accordance with the preferred embodiment of the present invention.

Referring first to FIG. 1, there is shown an outer telescoping tube segment 10. An inner telescoping tube segment 12 is received within the central opening or lumen of the outer tube segment 10. A locking mechanism, indicated generally by numeral 14, permits the inner tube segment 12 to be releasably locked at a desired location degree of extension relative to the outer tube segment 10. The tubes 10 and 12 may be formed from various types of materials, including aluminum, fiberglass, or any one of a number of other metals or plastics.

Figure 2:
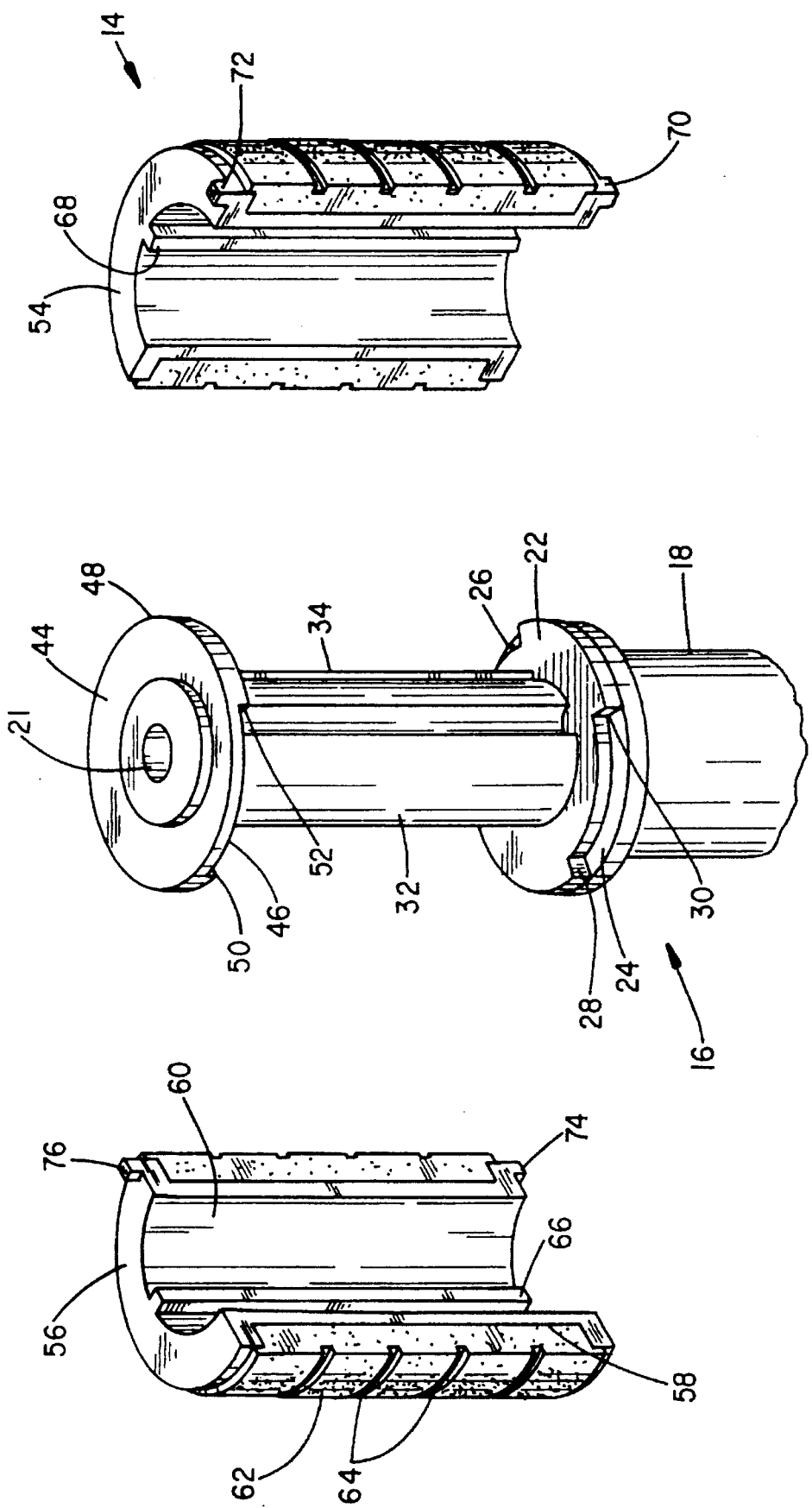
FIG. 2 is a blown-apart perspective view of the pole lock assembly illustrated in FIG. 1.
Figure 3:
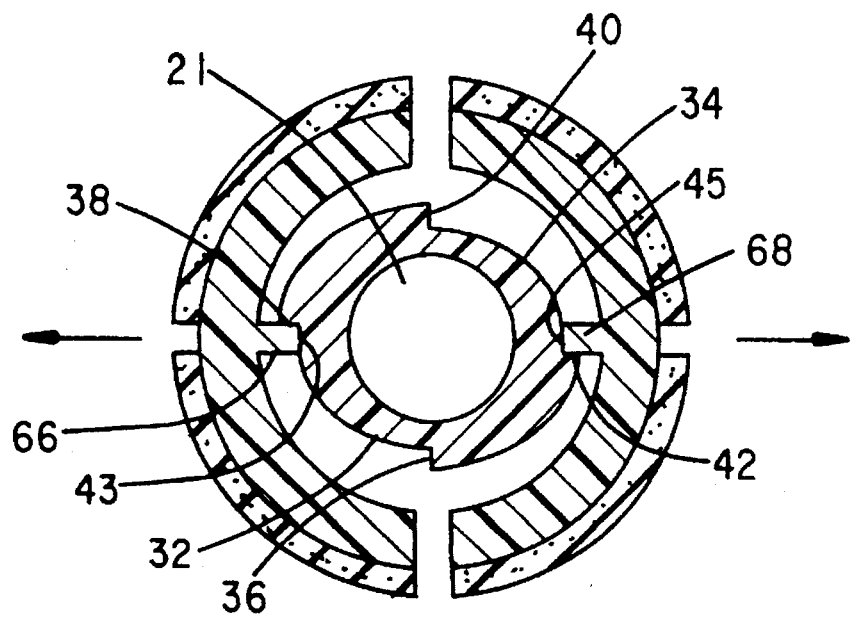
FIG. 3 is a cross-sectional view taken through the pole lock assembly along the line 3—3 in FIG. 1 when the cam is in its locked position.

Referring momentarily to the exploded view of the lock mechanism illustrated in FIG. 2, it is seen to comprise an elongated, rigid, tubular cam indicated generally by numeral 16, and having a tubular stem portion 18 adapted to fit into the open end of the inner telescoping tube 12. The stem or plug portion 18 is held in place by a suitable fastener, such as a rivet or screw 20, that extends through an aperture formed in the inner tube segment 12 and into the stem portion 18. Extending lengthwise through the cam 16 is a central lumen 21. Projecting radially outward from the stem 18 is a first circular flange 22 having diametrically opposed arcuate grooves 24 and 26, each defining a pair of circumferentially spaced abutment surfaces, as at 28 and 30. Concentrically disposed relative to the circular flange 22 is the cam portion itself and it is shown as also being tubular and including a pair of diametrically opposed cam surfaces 32 and 34. As is best illustrated in FIG. 3, the cam surfaces 32 and 34 are of continuously varying radii relative to the central axis thereof and they extend over a predetermined arc between a pair of radially spaced, longitudinal stop members 36 and 38 in the case of cam surface 32 and 40 and 42 in the case of cam surface 34. Proximate stops 38 and 42 are relatively shallow detent notches 43 and 45.

At the end of the cam surfaces 32 and 34 that is opposite from the flange 22 is a second flange 44 which has corresponding arcuate grooves 46 and 48 formed in the undersurface thereof and defining circumferentially spaced abutments at the opposite ends thereof. Abutments 50 and 52 are visible in the view of FIG. 2.

Completing the tube lock assembly 14 are first and second cam followers 54 and 56 which are disposed in surrounding relation to the tubular cam 16. Each cam follower can be seen to comprise a molded, generally cylindrical segment having an outer surface 58 and an inner surface 60, in the case of cam follower 56. The outer surface has a first predetermined radius greater than the corresponding radius of the inner surface 60 to thereby define a predetermined wall thickness to the part. The exterior surface 58 of the first cam follower 56 and the corresponding outer surface of the second cam follower 54 is covered with a soft, deformable elastomeric material 62. This cover material includes a plurality of regularly spaced slots as at 64, the purpose of which is to provide space for the elastomeric material to flow as the cover material is compressed in a manner yet to be described.

Figure 3A:
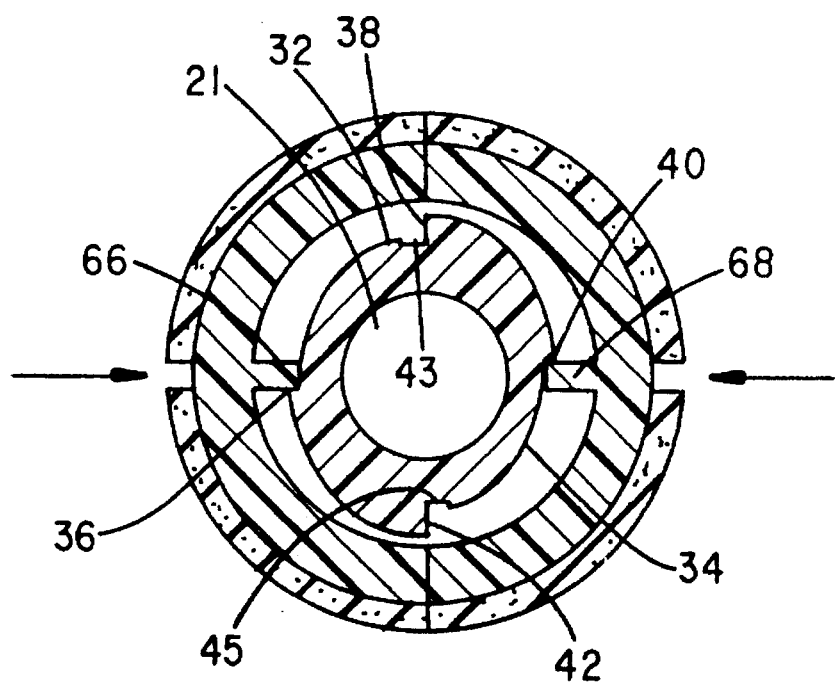
FIG. 3A is a cross-sectional view taken along the line 3—3 in FIG. 1 when the cam is in its unlocked orientation.

With reference to FIGS. 2, 3 and 3A of the drawings, there can be seen projecting outwardly from the inner surfaces of the each of the cam follower members 54 and 56 a longitudinally extending rib that is adapted to engage the cam surfaces 32 and 34 and the pair of radially spaced longitudinal stop members 36–38 and 40–42 of the tubular cam 16.

Projecting longitudinally from the upper and lower end surfaces of the cam followers 54 and 56 are integrally molded tabs as at 70–72 for cam follower 54 and 74–76 for cam follower 56. As will be explained in greater detail hereinbelow, the tabs 70–72 fit into the arcuate grooves 26 and 48 of the flanges of cam 16 and, similarly, the tabs 74 and 76 of cam follower 56 are arranged to reside within the arcuate grooves 24 and 46 of the opposed flanges on tubular cam 16.

Referring again to FIG. 1, press fit onto the lower end of the outer telescoping tube 10 is an annular collar 78 having an inwardly extending flange portion 80 closely surrounding, but not frictionally engaging, the outer surface of the inner telescoping tube segment 12. The flange 80 cooperates with the lower circular flange 22 of the tubular cam 16 and prevents the two telescoping pole segments from being pulled free of one another.

Having described in detail the individual parts comprising the improved lock mechanism and the detailed features thereof, consideration will next be given to the operation in effecting the locking and unlocking of the telescoping tube segments against longitudinal displacement. In this regard, the views of FIGS. 3 and 3A are deemed helpful.

With the locking mechanism 14 assembled to the end of the inner tubular member 12 and projecting outwardly therefrom into the central lumen of the outer tubular member 10, as seen in FIG. 1, a 90° rotation of the inner tubular member while maintaining the outer tubular member fixed, causes the longitudinal ribs 66 and 68 of the cam followers 54 and 56 to ride along the caming surfaces 32 and 34 until they abut the longitudinal stop members 38 and 42 where the ribs 38 and 68 reside in the detent notches 43 and 45. The resulting spreading of the cam followers causes the non-slip elastomeric surfaces of the cam followers to press firmly against the inside wall of the central opening of the outer tubular member 10 locking the two telescoping pole segments against longitudinal displacement.

To release the pole segments and allow longitudinal displacement, the user need only rotate the inner tubular member in the opposite direction from before until the longitudinal ribs 66 and 68 are brought into engagement with the stop members 36 and 40 on the cam.

By providing the tabs 70–72 and 74–76 on the two cam followers 54 and 56, any tendency for the cam followers to adhere to the inside wall of the outer tubular member can be overcome by merely continuing to rotate the inner telescoping tube segment and cam in the unlocking direction until the tabs 70 and 72 engage the abutments 28 and 50 and the tabs 74 and 76 engage the corresponding abutments defined by the notches 26 and 48 on the radial flanges. This continued rotation will overcome any sticking forces that might have existed between the elastomeric surface of the cam followers and the outer telescoping tube segment. Because the cam 16 is tubular, having a lumen 21 extending completely through it, it is possible to have objects such as electrical wires of mechanical linkages run centrally through the extendable poles where they are better shielded from damage.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Apparatus for releasably locking inner and outer telescoping tube segments against longitudinal movement relative to one another, comprising:

(a) an elongated, rigid tubular cam having a pair of diametrically opposed cam surfaces of continuously varying radii extending over a predetermined arc between a pair of radially spaced longitudinal stop members and having opposed ends with a radially extending circular flange at each of the opposed ends, the circular flanges including diametrically opposed arcuate grooves formed in a surface thereof defining first and second abutments; and (b) first and second cam followers disposed in surrounding relation to said tubular cam, each cam follower comprising a generally cylindrical segment having an outer surface of a first predetermined radius generally equal to a radius of the circular flanges on said cam and a concentric cylindrical inner surface of a second radius less than said first predetermined radius, each segment being substantially semicircular in cross section, the cylindrical inner surface of each segment including an outwardly projecting longitudinal rib for engagement with a respective one of the pair of cam surfaces and the pair of radially spaced longitudinal stop members, said first and second cam followers further including longitudinally projecting tabs for residing in the arcuate grooves of the circular flanges of the cam between the first and second abutments.

2. The apparatus as in claim 1 wherein the tubular cam includes a cylindrical, tubular stub portion adapted for attachment to one end of the inner telescoping tube segment, the elongated tubular cam and surrounding cam followers adapted to coaxially fit into the outer telescoping tube segment, rotation of the inner telescoping tube segment relative to the outer telescoping tube segment effecting radial displacement of the cam followers.

3. The apparatus as in claim 2 and further including a non-slip elastomeric covering on the cylindrical outer surfaces of the first and second cam followers.

4. The apparatus as in claim 1 and further including detent notches formed in the diametrically opposed cam surfaces of the rigid tubular cam adjacent the longitudinal stop members for receiving the outwardly projecting longitudinal ribs therein.

5. The apparatus as in claim 1 and further including detent notches formed in the diametrically opposed cam surfaces of the rigid tubular cam adjacent the longitudinal stop members for receiving the outwardly projecting longitudinal ribs therein when the longitudinally projecting tabs on the cam followers engage one of the first and second abutments.

6. Apparatus for releasably locking inner and outer cylindrical telescoping tube segments against longitudinal movement relative to one another, comprising:

(a) a tubular plug member having a cylindrical, tubular stub insertable into one end of said inner tube segment and affixed thereto to prevent relative rotation between said tubular plug member and said inner tube segment, said tubular plug member including a longitudinally projecting tubular cam centrally positioned on said tubular plug member, said tubular cam having a pair of diametrically opposed cam surfaces of continuously varying radii extending over a predetermined arc between a pair of radially spaced longitudinal stop members; and (b) first and second cam followers centered about said tubular cam, said first and second cam followers comprising a generally cylindrical outer surface of a first predetermined radius and a concentric cylindrical inner surface of a second radius less than the first predetermined radius, each segment being substantially semicircular in cross section, the cylindrical inner surface of each segment including an outwardly projecting longitudinal rib for engagement with the diametrically opposed cam surfaces and the pair of radially spaced longitudinal stop members, such that when said inner tube segment and said tubular plug member are inserted into said outer tube segment and said inner tube segment is turned in a first direction, the cylindrical outer surfaces of the first and second cam followers are out of contact with the inside surface of the outer tube segment and when the inner tube segment is turned in a second direction opposite the first direction, the outer surfaces of the first and second cam followers forcibly engage the inner surface of the outer tube segment to prevent longitudinal relative movement therebetween.

7. The apparatus as in claim 6 wherein the tubular cam has opposed ends with a radially extending circular flange at each of the opposed ends, the circular flanges having a radius generally equal to the first predetermined radius of the outer surface of the first and second cam followers.

8. The apparatus as in claim 7 wherein the circular flanges include diametrically opposed arcuate grooves formed in a surface thereof defining first and second abutments and the first and second cam followers each include longitudinally projecting tabs residing in the arcuate grooves between the first and second abutments.

9. The apparatus as in claim 8 and further including detent notches formed in the diametrically opposed cam surfaces of the rigid tubular cam adjacent the longitudinal stop members for receiving the outwardly projecting longitudinal ribs therein when the longitudinally projecting tabs on the cam followers engage one of the first and second abutments.

10. The apparatus as in claim 6 and further including a non-slip elastomeric covering on the cylindrical outer surfaces of the first and second cam followers.

11. The apparatus as in claim 6 and further including detent notches formed in the diametrically opposed cam surfaces of the rigid tubular cam adjacent the longitudinal stop members for receiving the outwardly projecting longitudinal ribs therein.

\* \* \* \* \*